United States Patent [19]

Rosaen et al.

[11] 4,197,207

[45] Apr. 8, 1980

[54] FLUID FILTERING DEVICE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 963,034

[22] Filed: Nov. 22, 1978

[51] Int. Cl.$^2$ ............................................. B01D 35/02
[52] U.S. Cl. .................................. 210/447; 210/448; 210/452
[58] Field of Search ....................... 210/310, 446–448, 210/451–454

[56] References Cited
U.S. PATENT DOCUMENTS

| | | | |
|---|---|---|---|
| 2,937,754 | 5/1960 | Kasten | 210/447 X |
| 3,397,516 | 8/1968 | Kobnick | 210/451 X |
| 3,748,837 | 7/1973 | Billeter | 210/452 X |
| 4,018,686 | 4/1977 | Shufflebarger et al. | 210/448 |
| 4,028,254 | 6/1977 | Shufflebarger et al. | 210/447 |

*Primary Examiner*—William A. Cuchlinski, Jr.
*Attorney, Agent, or Firm*—Gifford, Chandler, VanOphem, Sheridan & Sprinkle

[57] ABSTRACT

A fluid filtering device is provided for connection with a fluid line. The fluid device includes a housing having a fluid inlet on one end, a fluid outlet on the other end and a fluid passage formed through the housing. The fluid passage connects the inlet with the outlet and includes a port formed along its length. A tubular filter element open at one end is removably insertable into a filter chamber formed within the housing and, upon insertion, is axially slidable between a first position in which the open end of the filter element abuts against the fluid port and a second position in which the open end of the filter element is spaced from the fluid port. A spring urges the filter element toward its first position. In operation the fluid flow into the housing inlet passes through the port and into the interior of the filter element. The fluid then flows through the filter element and to the housing outlet. When the filter element becomes clogged, the resulting increase in differential pressure across the filter element forces the filter element to or towards its second or retracted position which enables direct fluid flow from the inlet and to the outlet while bypassing the filter element.

5 Claims, 3 Drawing Figures

FLUID FILTERING DEVICE

BACKGROUND OF THE INVENTION

I. Field of the Invention

The present invention relates generally to fluid filtering devices and, more particularly, to a fluid filtering device with a filter element bypass means.

II. Description of the Prior Art

There are, of course, a number of previously known fluid filtering devices which are adapted for connection in series with a fluid line in a fluid system. Such a fluid system can, for example, comprise a hydraulic system in which the fluid filtering device is connected to either the suction line from hydraulic reservoir and to the hydraulic system or the return line from the hydraulic system and to the fluid reservoir. In either case, it is necessary to maintain fluid flow through the filtering device in order to prevent pump cavitation, loss of system efficiency, or even damage to the hydraulic system.

It is well known in the art of fluid filtering devices that as a filter element becomes increasingly clogged with debris, the pressure drop across the filter element likewise increases and diminishes the outlet flow from the filter element. As the decreasing fluid flow becomes excessive, it can cause one or more of the aforementioned problems.

In order to protect the hydraulic or other fluid system from reduced fluid flow resulting from a clogged filter element, many previously known filtering devices include bypass means for bypassing the fluid flow around the filter element at a predetermined pressure drop across the filter element which is indicative of excess filter clogging. These previously known bypass means, however, are disadvantageous for several different reasons.

One disadvantage of these previously known bypass valves is that such valves are oftentimes complex in construction and are comprised of a multiplicity of separate elements. The complexity of these previously known bypass valves not only increases the initial construction or manufacturing cost of such valves but, in addition, such bypass valves are prone to failure since failure of any one of the numerous bypass valve components can render the valve inoperative.

Moreover, many of these previously known pypass valves simply comprise a valve member urged against a seat by a helical spring or other conventional resilient means. The valve member, which is of a relatively small area, forms the entire pressure sensing means and, due to its relatively small area size, the bypass valve member opens only slightly and somewhat spasmodically. Consequently, the fluid flow through the filter device, even with the bypass valve in its open position, is often at a lower than desired flow rate.

A still further disadvantage of these previously known bypass valves is that such bypass valves are typically secured directly to and within the housing for the fluid device. Consequently, when maintenance and/or cleaning of the bypass valve assembly is required, time consuming disassembly of virtually the entire fluid filtering device is usually required. Such disassembly of the fluid filter device also results in expensive and prolonged downtime for the hydraulic system.

SUMMARY OF THE PRESENT INVENTION

The present invention provides a simple and inexpensive fluid filtering device for connection with a fluid line which overcomes the above mentioned disadvantages of the previously known filter devices.

In brief, the filter device according to the present invention comprises a housing having a fluid inlet at one end, a fluid outlet at the other end, and a fluid passageway connecting the inlet with the outlet. A fluid port is formed along the length of the fluid passageway.

A filter assembly is also provided for connection with the housing and includes a tubular filter element which is open at one axial end. The filter assembly is removably insertable into the housing so that the open axial end of the filter element abuts against the fluid port whereby the fluid flow into the inlet of the housing passes through the open axial end of the filter element and into the interior of the filter element. The outer periphery of the filter element is, in turn, open to the fluid passageway at the outlet side of the filter device.

Unlike the previously known fluid filtering devices, however, the filter element is axially slidable between an extended position, in which the free end of the filter element abuts against and sealingly engages the fluid port, and a retracted position in which the free end of the filter element is spaced away from the fluid port. In its retracted position, the filter element permits the fluid flow through the filter device to bypass directly from the inlet and to the outlet. A helical spring urges the filter element towards its extended position.

In operation, as the filter element becomes clogged, the inlet fluid pressure, i.e., the pressure on the interior of the filter element, increases in the conventional fashion. At a predetermined degree of filter clogging, the pressure on the interior of the filter element overcomes the force of the helical spring and forces the filter element toward its retracted position and permits fluid to bypass through the port directly from the inlet and to the outlet. Moreover, since the entire interior surface of the filter element forms the fluid pressure sensing means, the axial displacement of the filter element is not only smooth but also enables a large volumetric flow rate through the filter device during a bypassing condition.

BRIEF DESCRIPTION OF THE DRAWING

The present invention will be more clearly understood upon reference to the following detailed description, when read in conjunction with the accompanying drawing, wherein like reference characters refer to like parts throughout the several views, and in which.

DETAILED DESCRIPTION OF THE PRESENT INVENTION

Figure 1:
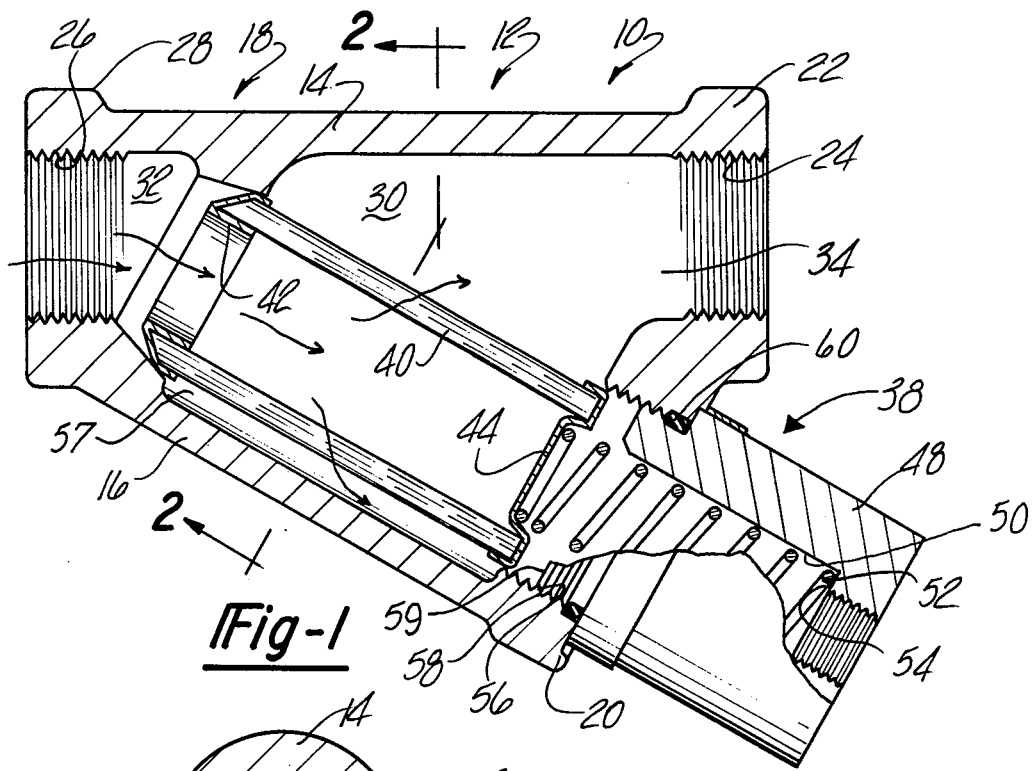
FIG. 1 is a longitudinal sectional view illustrating the fluid filtering device according to the present invention.
Figure 2:
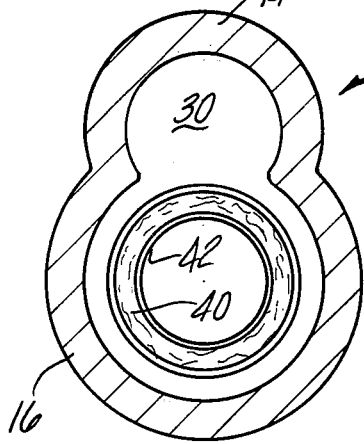
FIG. 2 is a sectional view taken substantially along line 2—2 in FIG. 1.

With reference first to FIGS. 1 and 2, the fluid filtering device 10 according to the present invention is thereshown and comprises a housing 12 having a first substantially cylindrical portion 14 and a second substantially cylindrical portion 16. The housing portions 14 and 16 acutely intersect at one end 18 of the housing 12 so that the free end 20 of the housing portion 16 lies closely adjacent the free end 22 of the housing portion 14. The housing portions 14 and 16 are integrally formed with each other.

A fluid outlet 24 is formed at the end 22 of the housing portion 14 while a fluid inlet 26 is formed at the opposite end 28 of the housing portion 14. Both the fluid inlet 26 and outlet 24 are adapted to receive conventional fluid couplings and, for this purpose, both the fluid inlet 26 and outlet 24 are internally threaded.

A fluid passageway 30 fluidly connects the fluid inlet 26 to the outlet 24 in the housing portion 14 and comprises a fluid inlet chamber 32 open to the housing inlet 26 and a fluid outlet chamber 34 open to the housing outlet 24. A fluid port outlet chamber 36 closely adjacent the inlet 26 fluidly connects the fluid chambers 32 and 34 together. The fluid port 36 is tapered or frustoconical in shape having its base facing and coaxial with the free end 20 of the second housing portion 16 for a reason to be shortly described.

A filter assembly 38 is provided for connection with the housing 12 and comprises a tubular cylindrical filter element 40 open at one end 42 and closed by a plate 44 at its other axial end. A helical spring 52 is coaxially secured to the plate 44 and extends axially away from the filter element 40.

The filter assembly 38 further includes an end cap 48 having a central axial recess 50 into which the helical spring 52 is axially slidably received. The helical spring 52 abuts at one end against the plate 44 and, at its other end, against an annular abutment surface 54 formed at the base of the recess 50.

The free end 20 of the second housing portion 16 is open via a threaded bore 56 greater in diameter than the filter element 40 while the cap 48 includes external threads 58 at one end 59 which threadably cooperates with the bore 56. The filter element 40 is thus axially insertable through the bore 56 and into a filter chamber 57 and the filter assembly 38 is removably attached to the housing 12 by screwing the cap 48 into the bore 56. Upon doing so, the free end 42 of the filter element 40 abuts against and sealingly engages the port 36 connecting the inlet chamber 32 to the outlet chamber 34. A conventional O-ring seal 60 is also preferably provided between the cap 48 and the housing portion 16 to prevent fluid leakage between the cap 48 and the housing 12.

With the end cap 48 attached to the housing 12 in the previously described fashion, the helical spring 52 urges the free end 42 of the filter element against the port 36. The spring 52 also serves, in conjunction with the shape of the port 36, to align the blind or free end 42 of the filter element 40 with the port 36. The closed end of the filter element 40, however, is axially spaced from the inner end 59 of the cap 48 so that the filter element 40 can retract towards the cap 48 for a predetermined distance. This retraction distance is, however, less than the distance of insertion of the free end 42 into the port 36 so that even with the filter element 40 retracted, the free end 42 of the filter element 40 partially remains within the port 36.

Figure 3:
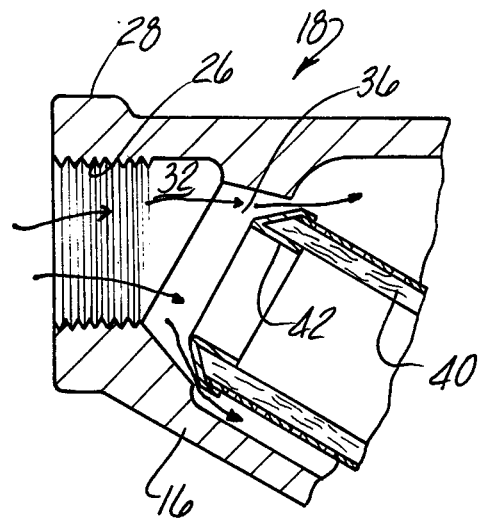
FIG. 3 is a fragmentary sectional view illustrating the fluid filtering device of the present invention in a bypass condition.

With reference now to FIGS. 1 and 3, the operation of the fluid filtering device 10 according to the present invention will now be described. FIG. 1 depicts the fluid filtering device in its filtering position in which the helical spring 52 urges the free end 42 of the filter element 40 against the port 36. Thus, fluid flow into the inlet 26 enters the interior of the filter element 40 through its open end and passes through the filter element 40 and into the outlet chamber 34 of the fluid passageway 30.

As the filter element 40 removes foreign debris from the fluid and the filter element 40 becomes increasingly clogged, the fluid pressure within the interior of the filter element 40 likewise increases with respect to the fluid pressure from the outlet chamber 34. When the fluid pressure within the interior of the filter element 40 increases past a predetermined amount, as determined by the helical spring 52, the fluid pressure forces the filter element 40 toward its retracted position and against the force of the helical spring 52. In doing so, the free end 42 of the filter element 40 moves away from the fluid port 36 thus permitting a portion of the fluid flow through the device 10 to bypass directly from the inlet chamber 32, through the port 36 and to the outlet chamber 34.

During the continued operation of the fluid filtering device 10, a portion of the fluid will continue to pass into the interior of the filter element 40 and through the filter element 40 thus further clogging the filter element 40 with debris. The further clogging of the filter element 40 in turn further increases the pressure within the interior of the filter element 40 and thus further displaces the filter element 40 towards the cap 48. In this manner the filter element 40 gradually, but steadily, moves from its extended or filtering position and towards its retracted or bypassing position shown in FIG. 3. The volumetric rate of fluid bypassing the filter element increases with the amount of retraction of the filter element 40.

The continued flow of fluid through the filter element 40 at the initiation of fluid bypassing is greatly enhanced by aligning the axis of the filter element 40 at a sharply acute angle with respect to the axis of the fluid passageway 30. By this construction, the momentum of the influent into the filter device 10 naturally carries the fluid into the interior of the filter element 40.

From the foregoing it can be seen that the fluid filtering device 10 according to the present invention is of a simple and inexpensive construction and yet is totally effective in use. Moreover, since the entire interior of the filter element 40 forms the bypass pressure sensing means, the retraction of the filter element from its extended and to its retracted position is not only smooth and steady but also insures a large fluid flow when the filter element 40 is in its bypass position.

The present invention is further advantageous in that the filter element 40 forms the bypass valve itself thereby eliminating the need for separate, complex and expensive bypass valve means. Moreover, the entire filter assembly 38, including the bypass means, can be simply, easily and rapidly removed from the housing 12 by merely unscrewing the cap 48 and removing the filter assembly. Thus, the bypass means can be cleaned, repaired or replaced exteriorly of housing 12 while a substitute filter assembly can ensure continued operation of the filter device 10.

Having described my invention, however, many modifications thereto will become apparent to those skilled in the art to which it pertains without deviation from the spirit of the invention as defined by the scope of the appended claims.

I claim:

1. A fluid filtering device for connection with a fluid line, said device comprising:

a housing having a fluid inlet and a fluid outlet, said fluid inlet and fluid outlet being substantially aligned with each other;

fluid passage means formed in said housing for connecting said inlet to said outlet, said passage means including a port formed along its length and adjacent the fluid inlet, said passage means further comprising a substantially cylindrical outlet chamber between said port and said fluid outlet;

said housing further comprising a first substantially cylindrical portion, said first cylindrical having the inlet formed on one end and the outlet formed on the other end, said housing further comprising a second substantially cylindrical portion, said second cylindrical portion intersecting said first cylindrical portion at said port and branching outwardly from the first portion and toward the first portion outlet end at an acute angle, said second cylindrical portion defining a filter chamber, a part of said first cylindrical portion defining said outlet chamber, and one side of said filter chamber being open to said outlet chamber along the entire length of the filter chamber;

a tubular filter element open at one end;

means for axially slidably mounting said filter element in said filter chamber between a first and second axial position, wherein in said first position the open end of said filter element abuts against said port so that the interior of said filter element is open to the housing inlet while the exterior of the filter element is open to the filter chamber, and wherein in said second position said open end of the filter element is spaced from the port to thereby enable fluid flow directly from said port and into said outlet chamber to thereby bypass the filter element; and means for resiliently urging said filter element toward said first position.

2. The invention as defined in claim 1 wherein said port is frustoconical in shape having its base facing the filter element, said filter element being cylindrical in shape, and said port being coaxial with the second housing portion so that said port forms a seat for the free end of the filter element.

3. The invention as defined in claim 2 wherein the free end of the filter element is frustoconical in shape.

4. The invention as defined in claim 1 wherein the free end of the second housing portion is open and wherein said device further comprises an end cap coaxially secured to the other end of the filter element and means formed on the end cap for detachably connecting said cap end to the open end of the second housing portion, said filter element being removably insertable through the open end of the second housing portion.

5. The invention as defined in claim 4 wherein said device further comprises an elongated cylindrical extension member coaxially connected at one end to the second mentioned end of the filter element and having its other end axially slidably received in a recess in the end cap and wherein said resilient means comprises a helical spring in a state of compression disposed around said extension member, said spring having an end abutting against the filter element and its other end abutting against said end cap.

* * * * *